US012760793B2

(12) United States Patent
Godo et al.

(10) Patent No.: US 12,760,793 B2
(45) Date of Patent: Oct. 13, 2026

(54) DRIVE AXLE SYSTEM AND METHOD OF CONTROL

(71) Applicant: ArvinMeritor Technology, LLC, Troy, MI (US)

(72) Inventors: Edvin Godo, Troy, MI (US); Banuchandar Muthukumar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 279 days.

(21) Appl. No.: 18/422,805

(22) Filed: Jan. 25, 2024

(65) Prior Publication Data

US 2025/0243931 A1 Jul. 31, 2025

(51) Int. Cl.

| | |
|---|---|
| ***F16H 61/04*** | (2006.01) |
| ***B60K 1/02*** | (2006.01) |
| ***B60K 17/08*** | (2006.01) |
| ***B60L 15/20*** | (2006.01) |
| ***F16H 59/18*** | (2006.01) |
| ***F16H 59/38*** | (2006.01) |
| ***F16H 59/68*** | (2006.01) |
| ***F16H 63/46*** | (2006.01) |
| ***F16H 63/50*** | (2006.01) |
| *B60K 1/00* | (2006.01) |

(52) U.S. Cl.

CPC ........... *F16H 61/0403* (2013.01); *B60K 1/02* (2013.01); *B60K 17/08* (2013.01); *B60L 15/20* (2013.01); *F16H 59/18* (2013.01); *F16H 59/38* (2013.01); *F16H 59/68* (2013.01); *F16H 63/46* (2013.01); *F16H 63/502* (2013.01); *B60K 2001/001* (2013.01); *B60L 2240/425* (2013.01); *B60L 2240/507* (2013.01); *B60L 2250/26* (2013.01); *F16H 2059/6807* (2013.01); *F16H 2061/0422* (2013.01); *F16H 2061/0474* (2013.01)

(58) Field of Classification Search

CPC ......... F16H 61/0403; F16H 2061/0422; F16H 2061/0474; F16H 59/18; F16H 59/38; F16H 59/68; F16H 2059/6807; F16H 2059/462; F16H 63/46; F16H 63/502; B60K 1/02; B60K 2001/001; B60K 17/08; B60K 17/043; B60K 17/36; B60K 2007/0061; B60K 7/0007; B60L 2240/425; B60L 2240/507; B60L 2250/26; B60L 15/20; B60Y 2200/142

See application file for complete search history.

(56) References Cited

U.S. PATENT DOCUMENTS

| | | | |
|---|---|---|---|
| 10,989,288 | B1 | 4/2021 | Ghatti et al. |
| 11,002,352 | B2 | 5/2021 | Ghatti et al. |
| 11,038,396 | B2 | 6/2021 | Raya et al. |
| 11,207,976 | B2 | 12/2021 | Ghatti et al. |
| 11,209,072 | B2 | 12/2021 | Ghatti et al. |

(Continued)

FOREIGN PATENT DOCUMENTS

DE 102022001489 B3 * 9/2023 ................ B60L 3/04

*Primary Examiner* — Farhana Pervin

(74) *Attorney, Agent, or Firm* — Brooks Kushman P.C.

(57) ABSTRACT

A drive axle system and a method of control. The drive axle system comprises a first axle assembly, a second axle assembly, and a control module. The control module comprises a first core and a second core. The first core controls operation of the first axle assembly. The second core controls operation of the second axle assembly.

18 Claims, 3 Drawing Sheets

(56) References Cited

U.S. PATENT DOCUMENTS

| | | | | |
|---|---|---|---|---|
| 11,220,176 | B1 | 1/2022 | Cradit et al. | |
| 11,407,307 | B2 | 8/2022 | Lorenz et al. | |
| 11,428,297 | B1 | 8/2022 | Cradit et al. | |
| 11,987,117 | B2 * | 5/2024 | David | B60K 1/02 |
| 12,372,145 | B1 * | 7/2025 | Lee | F16H 1/20 |
| 2017/0334427 | A1 * | 11/2017 | Butcher | B60W 10/10 |
| 2018/0257631 | A1 * | 9/2018 | Fodor | B60W 10/18 |
| 2019/0193750 | A1 * | 6/2019 | Kim | B60W 10/08 |
| 2020/0247236 | A1 * | 8/2020 | Hirao | B60K 17/046 |
| 2020/0317048 | A1 * | 10/2020 | Kasaiezadeh Mahabadi | B60K 17/3515 |
| 2021/0009129 | A1 * | 1/2021 | Obergünner | B60W 10/08 |
| 2022/0065346 | A1 * | 3/2022 | Chen | B60K 17/354 |
| 2023/0054823 | A1 * | 2/2023 | David | B60K 1/00 |
| 2023/0339333 | A1 * | 10/2023 | Zhao | B60L 58/10 |
| 2023/0365115 | A1 * | 11/2023 | Choi | B60K 6/40 |
| 2024/0239206 | A1 * | 7/2024 | Choi | B60L 15/20 |
| 2024/0343113 | A1 * | 10/2024 | Houser | B60K 17/36 |

* cited by examiner

DRIVE AXLE SYSTEM AND METHOD OF CONTROL

TECHNICAL FIELD

The invention relates to a drive axle system for a vehicle and a method of control.

BACKGROUND

A drive axle system having electric motors is disclosed in U.S. Pat. No. 11,407,307.

SUMMARY

The invention relates to a drive axle system. The drive axle system comprises a first axle assembly, a second axle assembly, and a control module. The first axle assembly comprises a first transmission and a first electric motor. The first electric motor is configured to provide torque to the first transmission. The second axle assembly comprises a second transmission and a second electric motor. The second electric motor is configured to provide torque to the second transmission. The control module comprises a first core and a second core. The first core controls operation of the first axle assembly. The second core controls operation of the second axle assembly.

The control module may further comprise a supervisory core. The supervisory core communicates with the first core and the second core. The supervisory core coordinates operation of the first core and the second core.

The drive axle system may further comprise a vehicle control module. The vehicle control module communicates with the supervisory core. The vehicle control module communicates with an accelerator pedal. The accelerator pedal provides a signal indicative of a request for acceleration. The signal from the accelerator pedal may be transmitted directly to the vehicle control module without being transmitted through the control module to reach the vehicle control module.

The first axle assembly may further comprise a first clutch. The first clutch may be moveable between a first position and a second position. A first gear ratio of the first transmission may be provided when the first clutch is in the first position. A second gear ratio of the first transmission may be provided when the first clutch is in the second position. The first gear ratio differs from the second gear ratio. The first axle assembly may further comprise a first clutch actuator. The first clutch actuator may be configured to actuate the first clutch between the first position and the second position. The first core is configured to transmit a first shift signal to the first clutch actuator without transmitting the first shift signal to the supervisory core. The first core is configured to transmit the first shift signal to the first clutch actuator without transmitting the first shift signal to the second core.

The first axle assembly may further comprise a first clutch position sensor. The first clutch position sensor generates a first clutch position signal. The first clutch position signal is indicative of a position of the first clutch. The first clutch position signal is transmitted to the first core without being transmitted through the supervisory core. The first clutch position signal is transmitted to the first core without being transmitted through the second core.

The first axle assembly further comprises a first drive pinion. The first drive pinion is rotatable with the first clutch. The first axle assembly further comprises a first speed sensor. The first speed sensor generates a first speed signal indicative of a rotational speed of the first drive pinion. The first speed signal is transmitted to the first core without being transmitted through the supervisory core. The first speed signal is transmitted to the first core without being transmitted through the second core.

The second axle assembly may further comprise a second clutch. The second clutch may be moveable between a first position and a second position. A first gear ratio of the second transmission may be provided when the second clutch is in the first position. A second gear ratio of the second transmission may be provided when the second clutch is in the second position. The first gear ratio differs from the second gear ratio. The second axle assembly may further comprise a second clutch actuator. The second clutch actuator may be configured to actuate the second clutch between the first position and the second position. The second core is configured to transmit a second shift signal to the second clutch actuator without transmitting the second shift signal to the supervisory core. The second core is configured to transmit the second shift signal to the second clutch actuator without transmitting the second shift signal to the first core.

The second axle assembly may further comprise a second clutch position sensor. The second clutch position sensor generates a second clutch position signal. The second clutch position signal is indicative of a position of the second clutch. The second clutch position signal is transmitted to the second core without being transmitted through the supervisory core. The second clutch position signal is transmitted to the second core without being transmitted through the first core.

The second axle assembly further comprises a second drive pinion. The second drive pinion is rotatable with the second clutch. The second axle assembly further comprises a second speed sensor. The second speed sensor generates a second speed signal indicative of a rotational speed of the second drive pinion. The second speed signal is transmitted to the second core without being transmitted through the supervisory core. The second speed signal is transmitted to the second core without being transmitted through the first core.

The first electric motor may further comprise a first stator. The first electric motor may further comprise a first rotor. The first rotor is rotatable with respect to the first stator. The first axle assembly further comprises a first stator temperature sensor. The first stator temperature sensor generates a first stator temperature signal indicative of a temperature of the first stator. The first axle assembly further comprises a first rotor temperature sensor. The first rotor temperature sensor generates a first rotor temperature signal indicative of temperature of the first rotor. The first stator temperature signal is transmitted to the first core without being transmitted through the supervisory core. The first stator temperature signal is transmitted to the first core or without being transmitted through the second core. The first rotor temperature signal is transmitted to the first core without being transmitted through the supervisory core. The first rotor temperature signal is transmitted to the first core without being transmitted through the second core.

The second electric motor may further comprise a second stator. The second electric motor may further comprise a second rotor. The second rotor is rotatable with respect to the second stator. The second axle assembly further comprises a second stator temperature sensor. The second stator temperature sensor generates a second stator temperature signal indicative of a temperature of the second stator. The second axle assembly further comprises a second rotor temperature sensor. The second rotor temperature sensor generates a second rotor temperature signal indicative of temperature of the second rotor. The second stator temperature signal is transmitted to the second core without being transmitted through the supervisory core. The second stator temperature signal is transmitted to the second core or without being transmitted through the first core. The second rotor temperature signal is transmitted to the second core without being transmitted through the supervisory core. The second rotor temperature signal is transmitted to the second core without being transmitted through the first core.

The drive axle system may further comprise a first inverter. The first inverter is electrically connectable to the first electric motor and an electrical power source. The first core is configured to provide a first zero torque command signal to the first electric motor when there is a loss of communication between the control module and the first inverter. The first electric motor provides zero torque in response to the first zero torque command signal. The first zero torque command signal may be transmitted to the first electric motor without being transmitted through the supervisory core. The first zero torque command signal may be transmitted to the first electric motor without being transmitted through the second core.

The drive axle system may further comprise a second inverter. The second inverter is electrically connectable to the second electric motor to an electrical power source. The second core is configured to provide a second zero torque command signal to the second electric motor when there is a loss of communication between the control module and the second inverter. The second electric motor provides zero torque in response to the second zero torque command signal. The second zero torque command signal may be transmitted to the second electric motor without being transmitted through the supervisory core. The second zero torque command signal may be transmitted to the second electric motor without being transmitted through the first core.

A method of controlling a drive axle system is provided. The method includes providing torque with a first electric motor of a first axle assembly based on a first torque command signal generated by a first core of a control module when the first core receives a first signal from a first inverter. The first inverter electrically connects the first electric motor to an electrical power source. The method includes providing torque with a second electric motor of a second axle assembly based on a second torque command signal generated by a second core of the control module when the second core receives a second signal from a second inverter. The second inverter electrically connects the second electric motor to the electrical power source. The method includes stopping torque from being provided with the first electric motor when the first core does not receive the first signal from the first inverter.

The method may include increasing torque that is provided with the second electric motor when the first core does not receive the first signal from the first inverter.

The method may include stopping torque from being provided with the second electric motor second core does not receive the second signal from the second inverter.

A method of controlling a drive axle system is provided. The method includes controlling, with a first core of a control module, torque that is provided by a first electric motor of a first axle assembly to a first transmission of the first axle assembly by decreasing torque that is provided by the first electric motor. The method includes controlling, with a second core of the control module, torque that is provided by a second electric motor of a second axle assembly to a second transmission of the second axle assembly by increasing torque that is provided by the second electric motor. The method includes generating, with a first core, a first shift command when a rotational speed of the first transmission of the first axle assembly is sufficiently close to a rotational speed of a first drive pinion of the first axle assembly. The method includes actuating, with a first actuator of the first axle assembly, a first clutch of the first axle assembly based on the first shift command.

The method may include receiving a signal from an actuator pedal that is indicative of a request for acceleration, wherein the signal is received by a vehicle control module. The method may include generating a shift execution command with a supervisory core of the control module based on the signal from the accelerator pedal. The steps of controlling torque that is provided by the first electric motor with the first core of the control module and controlling torque that is provided with the second core of the control module may occur in response to the shift execution command.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms “a” and “an” and “the” are intended to include the plural forms as well, unless the context clearly indicates otherwise.

It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

Figure 1:
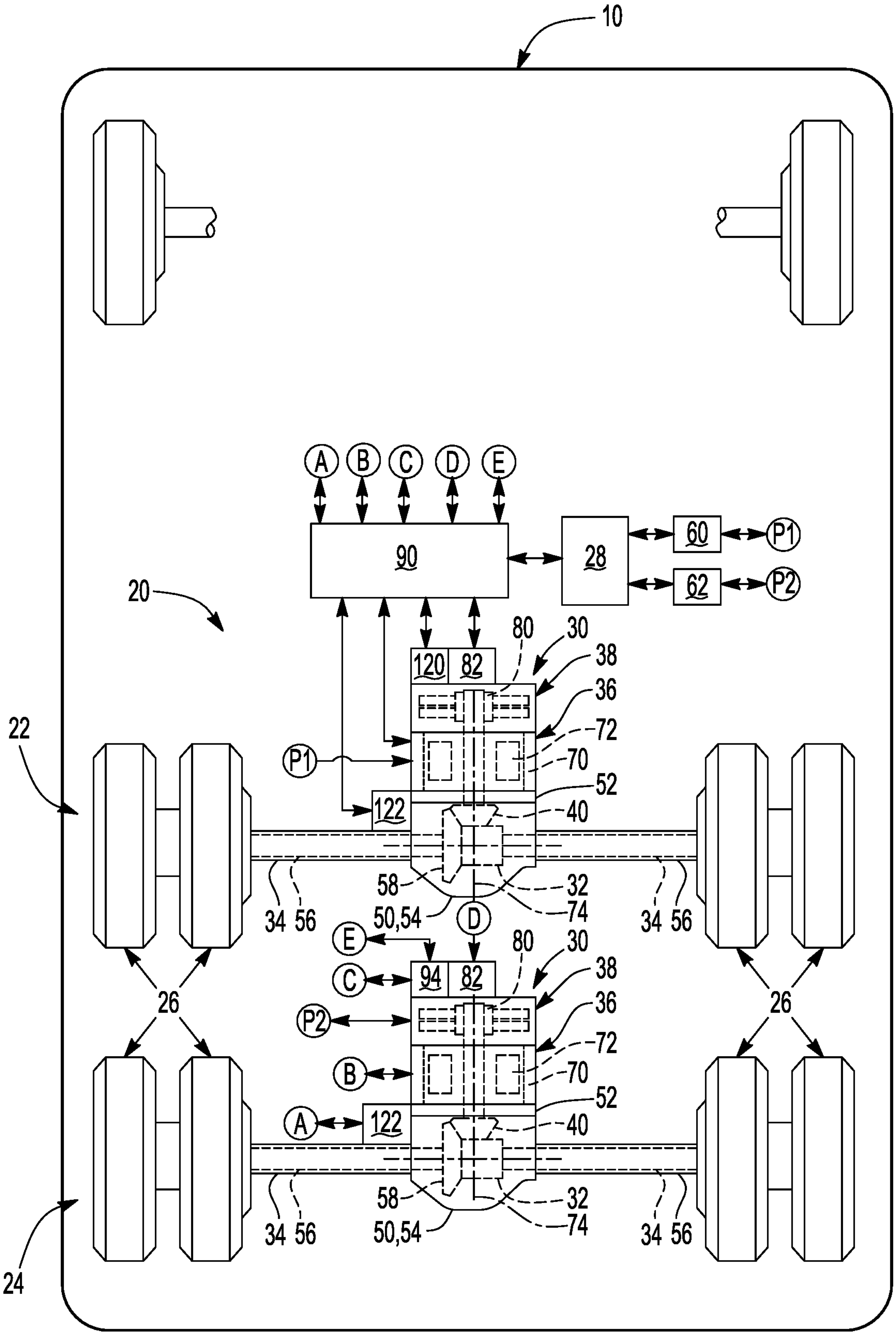
FIG. 1 is a schematic illustration of a vehicle comprising an example of a drive axle system.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 includes a drive axle system 20.

The drive axle system 20 includes a plurality of axle assemblies, such as a first axle assembly 22 and a second axle assembly 24. The first axle assembly 22 and the second axle assembly 24 are drive axle assemblies. A drive axle assembly is configured to provide torque to one or more wheel assemblies 26 that may be rotatably supported on the axle assembly. A wheel assembly 26 may include a tire disposed on a wheel. The drive axle system 20 may also include or be associated with a power source 28, such as an electrical power source like a battery.

In some configurations, the first axle assembly 22 and the second axle assembly 24 may generally be disposed near each other and may be positioned toward the rear of the vehicle 10, similar to a tandem axle arrangement. However, unlike a tandem axle arrangement, the first axle assembly 22 and the second axle assembly 24 are not operatively connected to each other and do not receive torque from the same electric motor. As such, the first axle assembly 22 and the second axle assembly 24 are not connected in series with each other with a shaft, such as a prop shaft that may connect an output of the first axle assembly 22 with an input of the second axle assembly 24. It is also contemplated that the first axle assembly 22 and the second axle assembly 24 may be arranged in a different manner, such as with either or both axle assemblies being disposed near the front of the vehicle.

The first axle assembly 22 and the second axle assembly 24 may have similar or identical configurations. For example, both axle assemblies 22, 24 include a housing assembly 30, a differential assembly 32, a pair of axle shafts 34, an electric motor 36, a transmission 38, a drive pinion 40, or combinations thereof. For convenience in reference, components of the first axle assembly 22 may be preceded by the word “first” (e.g., first electric motor, first transmission, first drive pinion, etc.) while components of the second axle assembly 24 may be preceded by the word “second” (e.g., second electric motor, second transmission, second drive pinion, etc.) when such a component is specifically referenced herein. The positioning of the differential assembly 32, the electric motor 36, and/or the transmission 38 may differ from that shown. For instance, the differential assembly 32 may be positioned between the electric motor 36 and the transmission 38.

The housing assembly 30 receives various components of a corresponding axle assembly 22, 24. In addition, the housing assembly 30 facilitates mounting of the axle assembly to the vehicle 10. In some configurations, the housing assembly 30 includes an axle housing 50 and a differential carrier 52.

The axle housing 50 may receive and support the axle shafts 34. In some configurations, the axle housing 50 includes a center portion 54 and at least one arm portion 56.

The center portion 54 may be disposed proximate the center of the axle housing 50. The center portion 54 may define a cavity that may receive the differential assembly 32.

One or more arm portions 56 may extend from the center portion 54. For example, two arm portions 56 may extend in opposite directions from the center portion 54 and away from the differential assembly 32. The arm portions 56 may each have a hollow configuration or tubular configuration that may extend around and may receive a corresponding axle shaft 34 and may help separate or isolate the axle shaft 34 from the surrounding environment. A wheel hub may be rotatably disposed on an arm portion 56 and operatively connected to an axle shaft 34. A wheel assembly 26 may be mounted to the wheel hub.

The differential carrier 52 is configured to be mounted to the center portion 54 of the axle housing 50. The differential assembly 32 may be rotatably supported on the differential carrier 52.

The differential assembly 32 is disposed in the housing assembly 30. For instance, the differential assembly 32 may be disposed in the center portion 54 of the axle housing 50. The differential assembly 32 may transmit torque to the axle shafts 34 of a corresponding axle assembly and permit the axle shafts and wheel assemblies 26 to rotate at different velocities in a manner known by those skilled in the art. For example, the differential assembly 32 may have a ring gear 58 that may be fixedly mounted on a differential case. The ring gear 58 and the differential case may be rotatable about a differential axis. The differential case may receive differential gears that may be operatively connected to the axle shafts 34.

The axle shafts 34 are configured to transmit torque between the differential assembly 32 and a corresponding wheel hub. For example, two axle shafts 34 may be provided such that each axle shaft 34 extends through a different arm portion 56 of axle housing 50. The axle shafts 34 may be rotatable about an axis, such as a wheel axis or the differential axis.

The electric motor 36 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electric motor 36 is used to brake or slow the velocity of the vehicle 10. Recovered energy may be transmitted from the wheel assemblies 26 to drive the electric motor 36. Thus, the electric motor 36 may function as a generator and may be used to charge the power source 28.

The electric motor 36 is electrically connected to the power source 28 via an inverter in a manner known by those skilled in the art. In FIG. 1, a first inverter 60 electrically connects or is electrically connectable to the electric motor 36 of the first axle assembly 22 and a second inverter 62 electrically connects or is electrically connectable to the electric motor 36 of the second axle assembly 24. An electrical connection between the first inverter 60 and the first axle assembly 22 is represented with connection symbol P1. An electrical connection between the second inverter 62 and the second axle assembly 24 is represented with connection symbol P2.

The electric motor 36 may be mounted to or positioned inside of the housing assembly 30. The electric motor 36 includes a stator 70 and a rotor 72. The stator 70 may be fixedly positioned with respect to the housing assembly 30. The stator 70 may encircle the rotor 72. The rotor 72 is rotatable about an axis 74 with respect to the stator 70.

The transmission 38 facilitates the transmission of torque between the electric motor 36 and the drive pinion 40. Torque transmission may be bidirectional. The transmission 38 may provide gear reduction and multiple gear ratios between the rotor 72 and the drive pinion 40. The transmission 38 may be of any suitable type. For instance, the transmission 38 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352; 11,209,072. Examples of an axle assembly having a dual countershaft transmission is disclosed in U.S. Pat. Nos. 10,989,288, 11,207,976; 11,220,176. Examples of an axle assembly having an epicyclic transmission are disclosed in U.S. Pat. Nos. 11,038,396; 11,428,297. The disclosures of the references in the preceding three sentences are hereby incorporated in their entirety by reference herein. The transmission 38 may include a clutch 80 and a clutch actuator 82, which is also referred to as an actuator. For convenience in reference, the clutch and clutch actuator of the first axle assembly 22 may be referred to as a first clutch and a first clutch actuator, respectively. Similarly, the clutch and clutch actuator of the second axle assembly 24 may be referred to as a second clutch and a second clutch actuator, respectively.

A clutch 80 controls rotation of one part with respect to another part. For instance, a clutch may connect and disconnect two parts, such as a driving part and a driven part. A clutch may have any suitable configuration. For example, a clutch may be configured as a friction clutch, electromagnetic clutch, hydraulic clutch or the like. A clutch may be configured as a slip clutch or a nonslip clutch. Slip clutches may be provided in various configurations, an example of which is a multi-plate clutch. A clutch 80 facilitates the engagement and disengagement of a component of the transmission 38 to provide a desired gear ratio. For example, a clutch may selectively couple a gear of a countershaft transmission to a shaft to permit torque transmission via that gear, and hence with an associated gear ratio, and may disengage or be decoupled from that gear to disable torque transmission via that gear. Similarly, a clutch may engage a component of an epicyclic gear set, such as a sun gear, to provide a first gear ratio and may engage another component, such as a planet gear carrier, to provide a second gear ratio. It is contemplated that the same clutch or different clutches may be used to provide different gear ratios.

Figure 5:
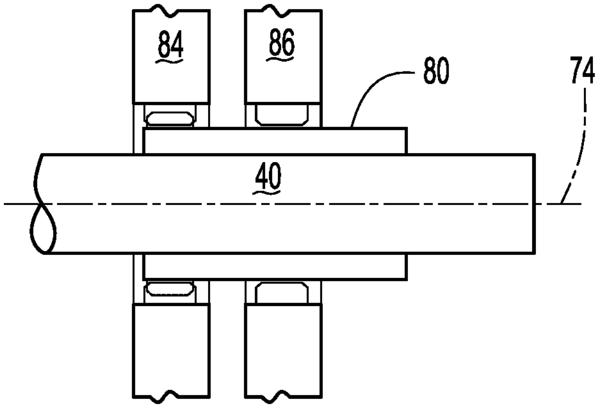
FIGS. 5 and 6 illustrate an example of a clutch in first and second positions, respectively.
Figure 6:
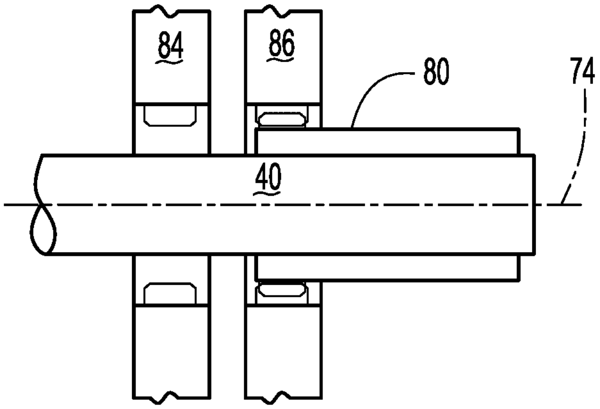

For simplicity, the clutch 80 will primarily be described in the context of a clutch that is a non-slip clutch like a dog clutch or shift collar that may be rotatable about an axis 74 with a corresponding drive pinion 40, such as with mating splines, and that is moveable or slidable along the axis 74 with respect to the drive pinion 40 between a first position and a second position in which the clutch 80 couples or operatively connects different components to the drive pinion 40. An example of a such a clutch 80 in first and second positions are shown in FIGS. 5 and 6, respectively. For instance, the clutch 80 may couple one gear 84 of an associated transmission, such as sun gear of an epicyclic gear set or a first gear of a countershaft gear set, to the drive pinion 40 when in the first position and may couple a different gear 86 of an associated transmission, such as a planet gear carrier of an epicyclic gear set or a second gear of a countershaft gear set, to the drive pinion 40 when in a second position. The clutch 80 may also be positionable in a neutral position in which the clutch 80 does not operatively connect or transmit torque between the transmission 38 and the drive pinion 40.

Referring to FIG. 1, the clutch actuator 82 is configured to actuate the clutch 80. For instance, the clutch actuator 82 may actuate the clutch 80 between the first position, the neutral position, the second position, or combinations thereof. For example, the clutch actuator 82 may move a clutch 80 between two positions, such as the first position and the neutral position, or all three positions. In some configurations, the clutch actuator 82 may move the clutch 80 along an axis, such as the axis 74, a countershaft axis, or the like. The clutch actuator 82 may be mounted on or inside the housing assembly 30.

The drive pinion 40 operatively connects the differential assembly 32 and the transmission 38. The drive pinion 40 may be received in the housing assembly 30 and may transmit torque between the differential assembly 32 and a transmission 38. The drive pinion 40 may be rotatable about an axis, such as the axis 74, and may have a gear portion that has teeth that meshes with teeth of the ring gear 58 of the differential assembly 32. Torque may be transmitted between the transmission 38 and the drive pinion 40 when the drive pinion 40 is operatively connected to the transmission 38, such as via an associated clutch 80. For example, torque that is provided from the electric motor 36 to the transmission 38 and to the drive pinion 40 may be transmitted to the ring gear 58 and thus to the differential assembly 32.

Figure 2:
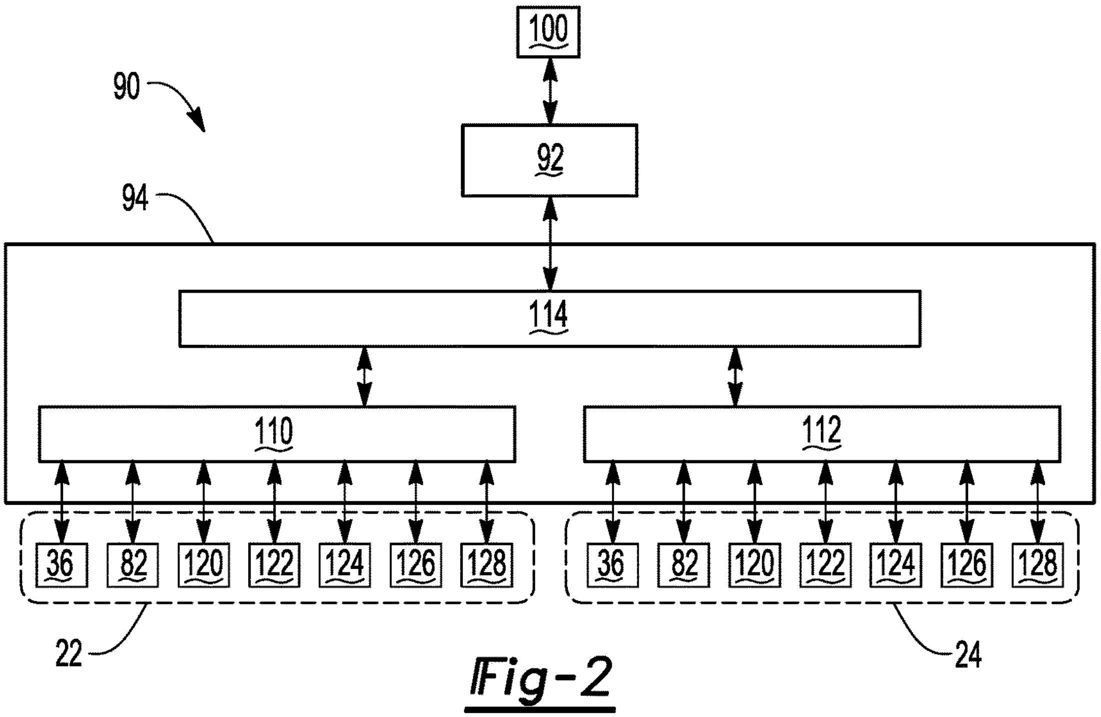
FIG. 2 is a schematic representation of a control system comprising a vehicle control module and a control module, and connections to components associated with first and second axle assemblies of the drive axle system.

Referring to FIGS. 1 and 2, a control system 90 controls operation of the drive axle system 20. In some configurations, the control system 90 includes a vehicle control module 92 and a control module 94. Control system connections are represented by the double arrowed lines in FIGS. 1 and 2 and by circled connection symbols (e.g., A, B, C, D, E) i FIG. 1. For clarity, some control system connections are shown in either FIG. 1 or FIG. 2 rather than in both figures. The control system 90 may also monitor and control the power source 28.

Referring to FIG. 2, the vehicle control module 92, which may also be referred to as a vehicle controller, may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the vehicle control module 92 as disclosed utilizes a microprocessor to execute a computer-program that is embodied in a non-transitory computer readable medium that is programmed to perform any number of the functions as disclosed. Further, the vehicle control module 92 as provided herein includes a housing and the microprocessor, integrated circuits, and memory devices (e.g., FLASH, random access memory (RAM), read only memory (ROM), electrically programmable read only memory (EPROM), electrically erasable programmable read only memory (EEPROM)) are positioned within the housing. The vehicle control module 92 as disclosed also includes hardware-based inputs and outputs for receiving and transmitting data, respectively from and to other hardware-based devices as discussed herein. For instance, the vehicle control module 92 may be electrically connected to the control module 94 and to an accelerator pedal 100.

The accelerator pedal 100 may be operated or actuated by a driver or operator of the vehicle 10 to request acceleration and deceleration of the vehicle 10. The accelerator pedal 100 may have any suitable configuration. For example, the accelerator pedal 100 may be a foot-operated pedal that may be mounted near the floor of the passenger compartment of the vehicle 10 or may be a hand-operated pedal that may be provided in another location, such as proximate a steering wheel or control console of the vehicle 10.

The accelerator pedal 100 may be moveable between a first position and a second position. The first position may be a released position in which the accelerator pedal 100 is not actuated or depressed by the driver. The first position may correspond with a 0% pedal position when expressed as a percentage. The second position may be a fully actuated or "full throttle" position in which the accelerator pedal 100 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for acceleration of the vehicle 10 and thus function as an accelerator pedal. Accordingly, the term accelerator pedal as used herein also encompasses such systems.

The accelerator pedal 100 may comprise a position sensor provides a signal that is indicative of the position of an accelerator pedal 100. For example, the accelerator pedal position sensor may provide a signal that is indicative of a request for acceleration the vehicle 10. The signal provided by the accelerator pedal position sensor may be referred to as a torque command signal and may be provided to the vehicle control module 92 and used as an input to control the torque (e.g., propulsion torque, regeneration torque) that is provided by an electric motor 36.

The control module 94, which may also be referred to as a powertrain control module, axle control module, or axle controller, includes a microprocessor that has multiple cores or processing units. A core is configured to perform operations or execute program instructions. Each core can perform operations or execute program instructions separately from the other cores and separately from the vehicle control module 92. In some configurations, the cores are parts of a single microprocessor. Each core can perform its operations or execute its program instructions at the same time as another core, thereby increasing the overall speed, such as for programs that support parallel computing techniques. In some configurations a core is associated with one or more corresponding memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the core or microprocessor core is configured to execute a computer-program that is embodied in a non-transitory computer readable medium that is programmed to perform any number of the functions as disclosed. In the configuration shown, the control module 94 is illustrated with three cores. These cores are referred to as a first core 110, a second core 112, and a supervisory core 114.

In some configurations, the control module 94 includes a housing, the microprocessor and its cores, and memory devices (e.g., FLASH, random access memory (RAM), read only memory (ROM), electrically programmable read only memory (EPROM), electrically erasable programmable read only memory (EEPROM)). The microprocessor and memory devices are positioned within the housing. The control module 94 may be disposed in a different housing than the vehicle control module 92 and may communicate with the vehicle control module 92. The control module 94 as disclosed also includes hardware-based inputs and outputs for receiving and transmitting data, respectively from and to other hardware-based devices as discussed herein.

The first core 110 is configured to control operation and diagnostics of the first axle assembly 22. For instance, the first core 110 may execute program instructions that monitor and/or control operation of the first electric motor or electric motor of the first axle assembly 22 and first clutch actuator or clutch actuator 82 of the first axle assembly 22. The first core 110 may not control operation of the second axle assembly 24. In some configurations, the first core 110 may be electrically connected to a first speed sensor 120 of the first axle assembly 22, a second speed sensor 122 of the first axle assembly 22, a stator temperature sensor 124 of the first axle assembly 22, a rotor temperature sensor 126 of the first axle assembly 22, and a clutch position sensor of the first axle assembly 22.

The first speed sensor 120 of the first axle assembly 22 is configured to generate, transmit, or provide a signal indicative of the rotational speed or rotational velocity of a rotatable component disposed upstream from the clutch 80, such as the rotor 72 or a gear of the transmission 38 of the first axle assembly 22. The first speed sensor 120 may detect the rotational speed or rotational velocity of the rotatable component. In some configurations, the signal from the first speed sensor 120 is transmitted to the first core 110 or transmitted directly to the first core 110 without first passing through or being transmitted through the vehicle control module 92, the second core 112, the supervisory core 114, or combinations thereof. Transmitting the signal directly to the first core 110 helps reduce latency effects and allows the first core 110 to more promptly monitor and control operation of the first axle assembly 22.

The second speed sensor 122 of the first axle assembly 22 is configured to generate, transmit, or provide a signal indicative of the rotational speed or rotational velocity of the clutch 80 or a rotatable component disposed downstream from the clutch 80, such as the drive pinion 40, the differential assembly 32, an axle shaft 34, a wheel hub or the like. The second speed sensor 122 may detect the rotational speed or rotational velocity of the rotatable component. The first speed sensor 120 and the second speed sensor 122 of the first axle assembly 22 may be used in conjunction to determine when the rotational speed of the clutch 80 is sufficiently synchronized with the rotational speed of another component, such as a transmission gear, to permit movement or shifting of the clutch 80. Accordingly, the terms "synchronized" or "sufficiently synchronized" mean that the rotational speed of two components may be sufficiently close so as to permit the clutch 80 to be shifted and may not require exactly the same rotational speed. In some configurations, the signal from the second speed sensor 122 is transmitted to the first core 110 or transmitted directly to the first core

110 without first passing through or being transmitted through the vehicle control module 92, the second core 112, the supervisory core 114, or combinations thereof. Transmitting the signal directly to the first core 110 helps reduce latency effects and allows the first core 110 to more promptly monitor and control operation of the first axle assembly 22.

The stator temperature sensor 124 of the first axle assembly 22, which may also be referred to as a first stator temperature sensor, is configured to generate, transmit, or provide a signal indicative of the temperature of the first stator or stator 70 of the first axle assembly 22. In some configurations, the signal from the stator temperature sensor 124 of the first axle assembly 22 is transmitted to the first core 110 or transmitted directly to the first core 110 without first passing through or being transmitted through the vehicle control module 92, the second core 112, the supervisory core 114, or combinations thereof. Transmitting the signal directly to the first core 110 helps reduce latency effects and allows the first core 110 to more promptly monitor and control operation of the first axle assembly 22.

The rotor temperature sensor 126 of the first axle assembly 22, which may also be referred to as a first rotor temperature sensor, is configured to generate, transmit, or provide a signal indicative of the temperature of the first rotor or rotor 72 of the first axle assembly 22. In some configurations, the signal from the rotor temperature sensor 126 of the first axle assembly 22 is transmitted to the first core 110 or transmitted directly to the first core 110 without first passing through or being transmitted through the vehicle control module 92, the second core 112, the supervisory core 114, or combinations thereof. Transmitting the signal directly to the first core 110 helps reduce latency effects and allows the first core 110 to more promptly monitor and control operation of the first axle assembly 22.

The clutch position sensor 128 of the first axle assembly 22, which may also be referred to as a first clutch position sensor, is configured to generate, transmit, or provide a signal indicative of the position of the clutch 80 of the first axle assembly 22. In some configurations, the signal from the clutch position sensor 128 of the first axle assembly 22 is transmitted to the first core 110 or transmitted directly to the first core 110 without first passing through or being transmitted through the vehicle control module 92, the second core 112, the supervisory core 114, or combinations thereof. Transmitting the signal directly to the first core 110 helps reduce latency effects and allows the first core 110 to more promptly monitor and control operation of the first axle assembly 22.

The second core 112 is configured to control operation and diagnostics of the second axle assembly 24. For instance, the second core 112 may execute program instructions that monitor and/or control operation of the second electric motor or electric motor of the second axle assembly 24 and second clutch actuator or clutch actuator 82 of the second axle assembly 24. The second core 112 may not control operation of the first axle assembly 22. In some configurations, the second core 112 may be electrically connected to a first speed sensor 120 of the second axle assembly 24, a second speed sensor 122 of the second axle assembly 24, a stator temperature sensor 124 of the second axle assembly 24, a rotor temperature sensor 126 of the second axle assembly 24, and a clutch position sensor of the second axle assembly 24.

The first speed sensor 120 of the second axle assembly 24 is configured to generate, transmit, or provide a signal indicative of the rotational speed or rotational velocity of a rotatable component disposed upstream from the clutch 80, such as the rotor 72 or a gear of the transmission 38 of the second axle assembly 24. The first speed sensor 120 may detect the rotational speed or rotational velocity of the rotatable component. In some configurations, the signal from the first speed sensor 120 is transmitted to the second core 112 or transmitted directly to the second core 112 without first passing through or being transmitted through the vehicle control module 92, the first core 110, the supervisory core 114, or combinations thereof. Transmitting the signal directly to the second core 112 helps reduce latency effects and allows the second core 112 to more promptly monitor and control operation of the second axle assembly 24.

The second speed sensor 122 of the second axle assembly 24 is configured to generate, transmit, or provide a signal indicative of the rotational speed or rotational velocity of the clutch 80 of the second axle assembly 24 or a rotatable component disposed downstream from the clutch 80, such as the drive pinion 40, the differential assembly 32, an axle shaft 34, a wheel hub or the like. The second speed sensor 122 may detect the rotational speed or rotational velocity of the rotatable component. The first speed sensor 120 and the second speed sensor 122 of the second axle assembly 24 may be used in conjunction to determine when the rotational speed of the clutch 80 of the second axle assembly 24 is sufficiently synchronized with the rotational speed of another component, such as a transmission gear, to permit movement or shifting of the clutch 80. In some configurations, the signal from the second speed sensor 122 is transmitted to the second core 112 or transmitted directly to the second core 112 without first passing through or being transmitted through the vehicle control module 92, the first core 110, the supervisory core 114, or combinations thereof. Transmitting the signal directly to the second core 112 helps reduce latency effects and allows the second core 112 to more promptly monitor and control operation of the second axle assembly 24.

The stator temperature sensor 124 of the second axle assembly 24, which may also be referred to as a second stator temperature sensor, is configured to generate, transmit, or provide a signal indicative of the temperature of the second stator or stator 70 of the second axle assembly 24. In some configurations, the signal from the stator temperature sensor 124 of the second axle assembly 24 is transmitted to the second core 112 or transmitted directly to the second core 112 without first passing through or being transmitted through the vehicle control module 92, the first core 110, the supervisory core 114, or combinations thereof. Transmitting the signal directly to the second core 112 helps reduce latency effects and allows the second core 112 to more promptly monitor and control operation of the second axle assembly 24.

The rotor temperature sensor 126 of the second axle assembly 24, which may also be referred to as a second rotor temperature sensor, is configured to generate, transmit, or provide a signal indicative of the temperature of the second rotor or rotor 72 of the second axle assembly 24. In some configurations, the signal from the rotor temperature sensor 126 of the second axle assembly 24 is transmitted to the second core 112 or transmitted directly to the second core 112 without first passing through or being transmitted through the vehicle control module 92, the first core 110, the supervisory core 114, or combinations thereof. Transmitting the signal directly to the second core 112 helps reduce latency effects and allows the second core 112 to more promptly monitor and control operation of the second axle assembly 24.

The clutch position sensor 128 of the second axle assembly 24, which may also be referred to as a second clutch position sensor, is configured to generate, transmit, or provide a signal indicative of the position of the clutch 80 of the second axle assembly 24. In some configurations, the signal from the clutch position sensor 128 of the second axle assembly 24 is transmitted to the second core 112 or transmitted directly to the second core 112 without first passing through or being transmitted through the vehicle control module 92, the first core 110, the supervisory core 114, or combinations thereof. Transmitting the signal directly to the second core 112 helps reduce latency effects and allows the second core 112 to more promptly monitor and control operation of the second axle assembly 24.

The supervisory core 114 is configured to coordinate operation of the first core 110 and the second core 112, and thus coordinate operation of the first axle assembly 22 and the second axle assembly 24. For instance, the first core 110 and the second core 112 may not directly communicate with each other but instead the first core 110 and the second core 112 may communicate with the supervisory core 114. The supervisory core 114 acts an intermediary that may arbitrate operations of the first core 110 and the second core 112 to facilitate coordinated operation of the first axle assembly 22 and the second axle assembly 24 when such coordination is beneficial, such as to coordinate torque output, stagger gear shifts, etc. The supervisory core 114 is electrically connected to the vehicle control module 92, the first core 110, and the second core 112. In some configurations, the vehicle control module 92 may not directly communicate with the first core 110 and the second core 112, but instead the vehicle control module 92 may communicate with the supervisory core 114 and the supervisory core 114 acts as an intermediary between the vehicle control module 92 and the first core 110 and the second core 112 to facilitate coordinated operation of the first axle assembly 22 and the second axle assembly 24. It is also contemplated that the vehicle control module 92 may communicate directly with the first core 110 and the second core 112 in limited circumstances and that the majority of communication between the vehicle control module 92 and the first and second cores 110, 112 may be routed through the supervisory core 114.

Figure 3:
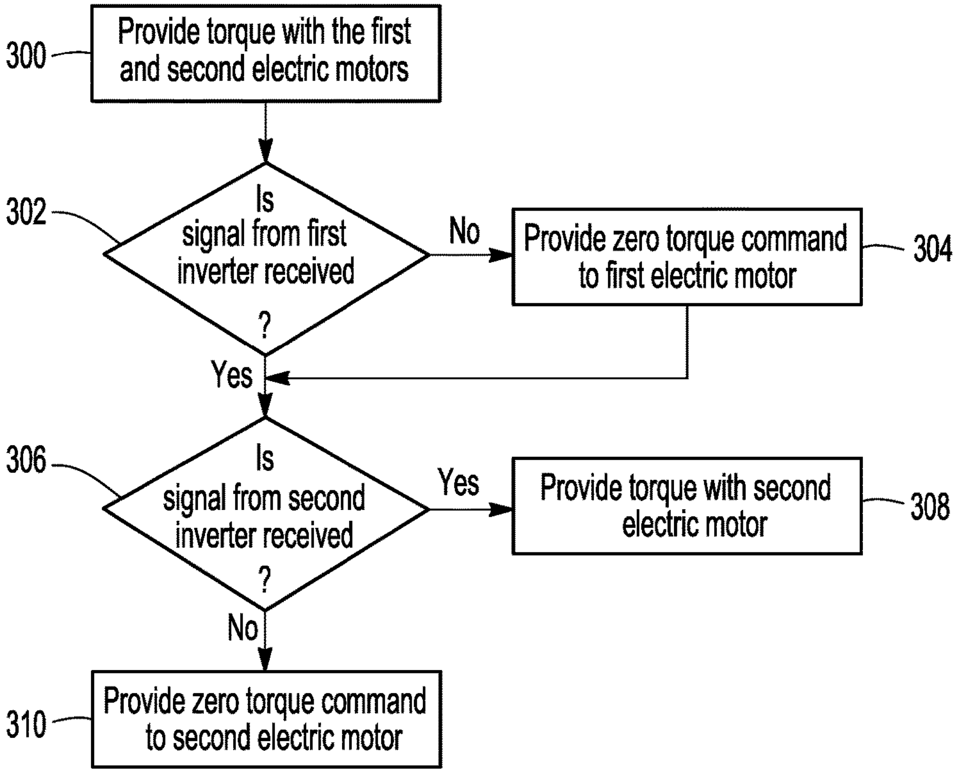
FIG. 3 is a flowchart of a method of control of the drive axle system.
Figure 4:
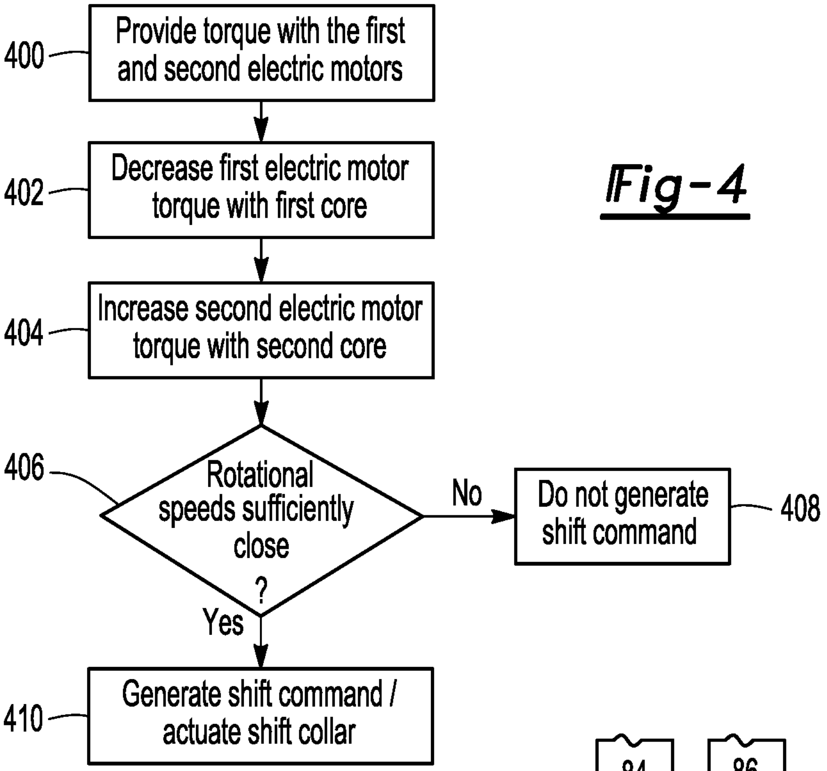
FIG. 4 is a flowchart of another method of control of the drive axle system.

Referring to FIGS. 3 and 4, flowcharts of examples of methods of controlling a drive axle system 20 are shown. As will be appreciated by one of ordinary skill in the art, the flowcharts may represent control logic which may be implemented or affected in hardware, software, or a combination of hardware and software. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language or operating system used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 90 and may be implemented as a closed loop control system.

As an overview, controlling operation of a drive axle system that has multiple axle assemblies with a nondedicated microprocessor controller or a microprocessor having a single core may lead to latency issues, throughput capacity issues, and greater software complexity. When multiple control modules are employed, routing various signals through one control module to reach another may result in potential latency issues as signal transmission or signal processing may be delayed. Similar issues can occur when some signals are routed through one core to reach a target core rather than more directly communicating with the target core. Employing separate microprocessors to control different axle assemblies increases the potential for data exchange corruption as compared to employing different cores of one microprocessor to control different axle assemblies. Moreover, employing separate dedicated microprocessors to control different axle assemblies does not provide coordinated control of the axle assemblies. To address these issues, the present invention employs a control module that has a microprocessor that has multiple cores as previously discussed.

Referring to FIG. 3, a method of control is shown that is responsive to a loss of communication between the control module and one or more inverters. The method is described beginning in an initial state in which there is no loss of communication between the inverter associated with the first axle assembly 22 and the inverter associated with the second axle assembly 24. As such, the first core 110 is in communication with the first inverter 60 (i.e., the inverter that is associated with or electrically connected to the first axle assembly 22) and the second core 112 is in communication with the second inverter 62 (i.e., the inverter that is associated with or electrically connected to the second axle assembly 24).

In operation 300, torque is provided with the electric motor 36 of the first axle assembly 22 and the electric motor 36 of the second axle assembly 24. Torque may be provided as propulsion torque or regenerative brake torque. In some configurations, torque is provided with the electric motor 36 of the first axle assembly 22 based on a first torque command signal generated by the first core 110 of the control module 94 and torque is provided with the electric motor 36 of the second axle assembly 24 based on a second torque command signal generated by the second core 112 of the control module 94. The first torque command signal and the second torque command signal may be based on the signal from the accelerator pedal 100. Moreover, the supervisory core 114 may control the proportion in which torque is split between the first axle assembly 22 and the second axle assembly 24. For instance, the supervisory core 114 may communicate with the first core 110 and the second core 112 and instruct the first core 110 and the second core 112 to provide torque such that torque is split evenly between the first axle assembly 22 and the second axle assembly 24 (e.g., a 50%/50% split) or such that torque is not split evenly between the first axle assembly 22 in the second axle assembly 24.

At operation 302, the first core 110 determines whether there is a loss of communication with the first inverter 60 or inverter of the first axle assembly 22. The communication signal may be transmitted directly between the first core 110 and the first inverter 60 as previously discussed. If there is a loss of communication between the first core 110 and the first inverter 60 (e.g., the first core 110 does not receive the signal from the first inverter 60), then the method continues at operation 304. If there is not a loss of communication between the first core 110 and the first inverter 60 (the first core 110 (e.g., the first core 110 receives the signal from the first inverter 60), then the method continues at operation 306.

At operation 304, the first core 110 provides a first zero torque command signal to the first electric motor (i.e., the electric motor 36 of the first axle assembly 22). The first zero torque command signal causes the first electric motor to provide zero torque or no torque (e.g., no propulsion torque and no regenerative brake torque). The first zero torque command signal may be transmitted to the first electric motor without being transmitted to or through the second core 112 and the supervisory core 114. In some configurations, the first zero torque command signal may not be transmitted to the vehicle control module 92. In some configurations, the first core 110 may also provide a notification signal to the vehicle control module 92, the supervisory core 114, or both, that there is a loss of communication with the first inverter 60.

At operation 306, the second core 112 determines whether there is a loss of communication with the second inverter 62 or inverter of the second axle assembly 24. The communication signal may be transmitted directly between the second core 112 and the second inverter 62 as previously discussed. If there is not a loss of communication between the second core 112 and the second inverter 62 (e.g., the second core 112 receives the signal from the second inverter 62), then the method continues at operation 308. If there is a loss of communication between the second core 112 and the second inverter 62 (e.g., the second core 112 does not receive the signal from the second inverter 62), then the method continues at operation 310.

At operation 308, the second core 112 may continue to command the second electric motor to provide torque. Optionally, the torque that is provided with the second electric motor may be increased to partially or completely make up for the torque no longer being provided by the first electric motor. For instance, the supervisory core 114 may command the second core 112 to provide additional torque in response to the notification signal provided by the first core 110. As an example, the supervisory core 114 may change the torque split between the first axle assembly 22 in the second axle assembly 24 and command the second core 112 to provide 100% of the torque to the second axle assembly 24 (e.g., a 0%/100% split). The second core 112 may then determine whether the torque split can be accommodated within the operating limits of the second axle assembly 24 (e.g., the torque output limits of the second electric motor and the second inverter). The torque output of the second electric motor may be limited by the operating temperatures of the second inverter 62, stator associated with the second axle assembly 24, rotor associated with the second axle assembly 24, or combinations thereof. For instance, the torque output that can currently be provided by the second electric motor may be based on the temperature of the stator 70 of the second electric motor, a temperature of the rotor 72 of the second electric motor, the temperature of the second inverter 62, or combinations thereof.

At operation 310, the second core 112 provides a second zero torque command signal to the second electric motor (i.e., electric motor 36 of the second axle assembly 24). The second zero torque command signal causes the second electric motor to provide zero torque or no torque (e.g., no propulsion torque and no regenerative brake torque). The second zero torque command signal may be transmitted to the second electric motor without being transmitted to or through the first core 110 and the supervisory core 114. In some configurations, the second zero torque command signal may not be transmitted to the vehicle control module 92. In some configurations, the second core 112 may also provide a notification signal to the vehicle control module 92, the supervisory core 114, or both that there is a loss of communication with the second inverter 62.

Referring to FIG. 4, a method of control is shown that is associated with vehicle propulsion control. For illustration purposes, the method is described under the following initial operational conditions. First, propulsion torque is being provided by both the first axle assembly 22 and the second axle assembly 24. Second, the first axle assembly 22 and the second axle assembly 24 are providing propulsion torque via their respective first gear ratios. In addition, the total torque may initially be split substantially equally between the first axle assembly 22 and the second axle assembly 24. For instance, the torque that is provided by the first electric motor to the first transmission and the torque that is provided by the second electric motor to the second transmission may be substantially equal. The term "substantially equal" as used herein means equal or very close to equal and includes output torque that is within 5% of being equal to each other.

At operation 400, torque is provided with the first electric motor or electric motor 36 of the first axle assembly 22 and the second electric motor or electric motor 36 of the second axle assembly. The first core 110 controls the torque that is provided by the first electric motor. The second core 112 controls the torque that is provided with the second electric motor. In some configurations, torque that is provided with the first electric motor is based on a first torque command signal generated by the first core 110 of the control module 94 and torque is provided with the second electric motor 36 is based on a second torque command signal generated by the second core 112 of the control module 94. The first torque command signal and the second torque command signal may be based on the signal from the accelerator pedal 100 as previously discussed. The supervisory core 114 may control the proportion in which torque is split between the first axle assembly 22 and the second axle assembly 24 as previously discussed. For illustration purposes, torque may initially be split evenly between the first axle assembly 22 and the second axle assembly 24 (e.g., a 50%/50% split).

At operations 402 and 404, the propulsion torque is redistributed between the axle assemblies in preparation for a gear shift. Torque redistribution may be triggered by a shift execution command that is generated by the supervisory core 114. The supervisory core 114 may generate the shift execution command based on the signal from the accelerator pedal 100 that is indicative of a request for acceleration. In some configurations, the signal from the accelerator pedal may be received by the vehicle control module 92. The vehicle control module 92 may transmit the signal to the supervisory core 114. Latency associated with transmitting the signal from the accelerator pedal 100 to the vehicle control module 92 and then to the supervisory core 114 may not affect vehicle operation in a manner that is perceptible to a vehicle operator. Controlling torque that is provided by the first electric motor at operation 402 and torque that is provided by the second electric motor at operation 404 occurs in response to the shift execution command.

At operation 404, torque is reduced in the axle assembly that is to be upshifted first. Torque may be increased in at least one other axle assembly to continue to provide or attempt to provide the requested propulsion torque. For example, the torque may be decreased in the first axle assembly 22. Torque may be decreased in the first axle assembly 22 by the first core 110, such as by reducing the propulsion torque or increasing the regenerative braking torque provided by the first electric motor to the first transmission. The reduction in torque provided by the first electric motor may facilitate a gear shift. For instance, reducing torque may make it easier to actuate an associated clutch 80.

At operation 404, torque is increased in the second axle assembly 24. Torque may be increased in the second axle assembly 24 by the second core 112, such as by increasing the propulsion torque or reducing the regenerative braking torque that is provided by the second electric motor to the second transmission.

Operations 402 and 404 may redistribute torque simultaneously. Thus, the torque that is provided by the first electric motor may be reduced when the torque that is provided by the second electric motor is increased. In addition, torque may be changed proportionally. For instance, the torque provided by the first electric motor may be reduced at the same rate and by the same amount as torque provided by the second electric motor is increased. Reducing the rotational speed of the first electric motor to reduce the rotational speed of a component that provides the second gear ratio so that there is sufficient synchronization of the rotational speeds to permit successful movement of the clutch, such as movement from the neutral position to engage the second gear ratio.

At operation 406, the first core 110 determines whether there is sufficient synchronization of the rotational speeds to permit successful movement of the first clutch, such as movement from the neutral position to engage the second gear ratio. The first core 110 may determine whether sufficient synchronization is present based on signals from the first speed sensor 120 and the second speed sensor 122 of the first axle assembly 22. For example, sufficient synchronization may be present when the speed or velocity indicated by the signal from the first speed sensor 120 of the first axle assembly 22 is sufficiently close or within a threshold amount or threshold range of the speed or velocity indicated by the signal from the second speed sensor 122 of the second axle assembly. Employing the first core 110 to determine whether there is sufficient synchronization may increase the likelihood of a successful shift as compared to a configuration in which speed signals are routed through multiple microprocessors or multiple cores or configurations in which a single microprocessor core controls multiple axle assemblies, noting that the window for executing a successful shift may be a fraction of a second Latency associated with transmitting a speed signal through another core or a different microprocessor may slow operation execution, such as when a single core is burdened by controlling different axle assemblies, may reduce the time available to complete a shift, or may result in a command to execute a shift being too late to obtain successful shift completion. If there is not sufficient synchronization of the rotational speeds, then the method continues at operation 408. If there is sufficient synchronization of the rotational speeds, then the method continues at operation 410.

At operation 408, the first core 110 does not generate a shift command. For instance, the first core 110 does not issue a first shift command that operates the clutch actuator the first axle assembly 22 to actuate the first clutch of the first axle assembly to conduct a gear shift by engaging the clutch with a gear of the transmission of the first axle assembly 22 that provides a different gear ratio.

At operation 410, the first core 110 generates the shift command. For instance, the first core 110 may issue or generate a first shift command that operates the clutch actuator the first axle assembly 22 and actuates the clutch of the first axle assembly 22 to conduct a gear shift by engaging the first clutch with a gear of the transmission of the first axle assembly 22 that provides a different gear ratio.

The present invention may address latency issues and throughput capacity issues associated with controlling different axle assemblies with different microprocessors or with the same single core of a microprocessor as compared to employing different cores. The present invention may avoid potential data exchange corruption issues that may be associated with using separate microprocessors (in contrast to separate cores of one microprocessor) to control different axle assemblies. Using different cores to control different axle assemblies may also allow commonized software to be executed by each core, such as software having common algorithms, core libraries, functionality, or combinations thereof. This may reduce software complexity, simplify software development and testing, and reduce associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system, the method comprising:

providing torque with a first electric motor of a first axle assembly based on a first torque command signal generated by a first core of a control module when the first core receives a first signal from a first inverter, wherein the first inverter electrically connects the first electric motor to an electrical power source;

providing torque with a second electric motor of a second axle assembly based on a second torque command signal generated by a second core of the control module when the second core receives a second signal from a second inverter, wherein the second inverter electrically connects the second electric motor to the electrical power source; and stopping torque from being provided with the first electric motor when the first core does not receive the first signal from the first inverter.

2. The method of claim 1 further comprising increasing torque that is provided with the second electric motor when the first core does not receive the first signal from the first inverter.

3. The method of claim 1 further comprising stopping torque from being provided with the second electric motor when the second core does not receive the second signal from the second inverter.

4. The method of claim 1 wherein:

the first axle assembly comprises a first transmission, wherein the electric motor is configured to provide torque to the first transmission; and the second axle assembly comprises a second transmission, wherein the second electric motor is configured to provide torque to the second transmission.

5. The method of claim 4 wherein the control module comprises a supervisory core that communicates with the first core and the second core and coordinates operation of the first core and the second core.

6. The method of claim 5 wherein the first electric motor further comprises a first stator and a first rotor that is rotatable with respect to the first stator, a first stator temperature sensor that generates a first stator temperature signal indicative of temperature of the first stator, and a first rotor temperature sensor that generates a first rotor temperature signal indicative of temperature of the first rotor, wherein the first stator temperature signal and the first rotor temperature signal are transmitted to the first core without being transmitted through the supervisory core and the second core.

7. The method of claim 5 wherein the second electric motor further comprises a second stator and a second rotor that is rotatable with respect to the second stator, a second stator temperature sensor that generates a second stator temperature signal indicative of temperature of the second stator, and a second rotor temperature sensor that generates a second rotor temperature signal indicative of temperature of the second rotor, wherein the second stator temperature signal and the second rotor temperature signal are transmitted to the second core without being transmitted through the supervisory core and the first core.

8. The method of claim 5 wherein the first axle assembly further comprises a first clutch that is moveable between a first position in which a first gear ratio of the first transmission is provided and a second position in which a second gear ratio of the first transmission is provided that differs from the first gear ratio, and a first clutch actuator that is configured to actuate the first clutch between the first position and the second position, wherein the first core transmits a first shift signal to the first clutch actuator without transmitting the first shift signal to the supervisory core or the second core.

9. The method of claim 8 wherein the first axle assembly further comprises a first drive pinion that is rotatable with the first clutch and a first speed sensor that generates a first speed signal indicative of a rotational speed of the first drive pinion, wherein the first speed signal is transmitted to the first core without being transmitted through the supervisory core and the second core.

10. The method of claim 8 wherein the first axle assembly further comprises a first clutch position sensor that generates a first clutch position signal that is indicative of a position of the first clutch, wherein the first clutch position signal is transmitted to the first core without being transmitted through the supervisory core and the second core.

11. The method of claim 10 wherein the first clutch position signal is indicative of the position of the first clutch along an axis along which the clutch is slidable to engage a gear of a transmission.

12. The method of claim 5 further comprising a vehicle control module that communicates with the supervisory core and an accelerator pedal that provides a signal indicative of a request for acceleration, wherein the signal from the accelerator pedal is transmitted directly to the vehicle control module without being transmitted through the control module to reach the vehicle control module.

13. The method of claim 12 wherein the second axle assembly further comprises a second clutch that is moveable between a first position in which a first gear ratio of the second transmission is provided and a second position in which a second gear ratio of the second transmission is provided that differs from the first gear ratio, and a second clutch actuator that is configured to actuate the second clutch between the first position and the second position, wherein the second core transmits a second shift signal to the second clutch actuator without transmitting the second shift signal to the supervisory core or the first core.

14. The method of claim 13 wherein the second axle assembly further comprises a second clutch position sensor that generates a second clutch position signal that is indicative of a position of the second clutch, wherein the second clutch position signal is transmitted to the second core without being transmitted through the supervisory core and the first core.

15. The method of claim 13 wherein the second axle assembly further comprises a second drive pinion that is rotatable with the second clutch and a second speed sensor that generates a second speed signal indicative of a rotational speed of the second drive pinion, wherein the second speed signal is transmitted to the second core without being transmitted through the supervisory core and the first core.

16. A method of controlling a drive axle system, the method comprising:

controlling, with a first core of a control module, torque that is provided by a first electric motor of a first axle assembly to a first transmission of the first axle assembly by decreasing torque that is provided by the first electric motor;

controlling, with a second core of the control module, torque that is provided by a second electric motor of a second axle assembly to a second transmission of the second axle assembly by increasing torque that is provided by the second electric motor;

generating, with the first core, a first shift command when a rotational speed of the first transmission of the first axle assembly is sufficiently close to a rotational speed of a first drive pinion of the first axle assembly; and actuating, with a first actuator of the first axle assembly, a first clutch of the first axle assembly based on the first shift command.

17. The method of claim 16 further comprising receiving a signal from an accelerator pedal that is indicative of a request for acceleration, wherein the signal is received by a vehicle control module; and generating a shift execution command with a supervisory core of the control module based on the signal, wherein the steps of controlling torque that is provided by the first electric motor with the first core of the control module and controlling torque that is provided by the second electric motor with the second core of the control module occurs in response to the shift execution command.

18. The method of claim 17 wherein the control module includes a microprocessor, the microprocessor includes the first core, the second core, and the supervisory core that communicates with and controls operation of the first and second cores, the supervisory core directly receives the signal from the accelerator pedal, the first core controls the first electric motor and transmits a first shift signal to a first clutch actuator without transmitting the first shift signal to the supervisory core or the second core, and the second core controls the second electric motor and transmits a second shift signal to a second clutch actuator without transmitting the second shift signal to the supervisory core or the first core.

* * * * *